(12) United States Patent
Shin et al.

(10) Patent No.: US 11,564,205 B2
(45) Date of Patent: Jan. 24, 2023

(54) METHOD AND APPARATUS FOR CONFIGURING DMRS INFORMATION IN V2X SYSTEM

(71) Applicant: Samsung Electronics Co., Ltd., Suwon-si (KR)

(72) Inventors: Cheolkyu Shin, Suwon-si (KR); Youngwoo Kwak, Suwon-si (KR); Hoondong Noh, Suwon-si (KR); Jeongho Yeo, Suwon-si (KR); Hyojin Lee, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 17/055,955

(22) PCT Filed: May 16, 2019

(86) PCT No.: PCT/KR2019/005883
§ 371 (c)(1),
(2) Date: Nov. 16, 2020

(87) PCT Pub. No.: WO2019/221533
PCT Pub. Date: Nov. 21, 2019

(65) Prior Publication Data
US 2021/0266868 A1    Aug. 26, 2021

(30) Foreign Application Priority Data

May 16, 2018  (KR) .................. 10-2018-0056179

(51) Int. Cl.
*H04W 72/04* (2009.01)
*H04W 72/02* (2009.01)
(Continued)

(52) U.S. Cl.
CPC ............ *H04W 72/02* (2013.01); *H04L 1/0061* (2013.01); *H04L 5/0051* (2013.01); *H04W 72/042* (2013.01); *H04W 72/0446* (2013.01)

(58) Field of Classification Search
CPC ............. H04W 72/02; H04W 72/0446; H04W 72/042; H04W 88/08; H04W 8/005; H04W 76/023; H04L 1/0061; H04L 5/0051
See application file for complete search history.

(56) References Cited

U.S. PATENT DOCUMENTS

2013/0195036 A1*  8/2013  Quan .................. H04W 72/085
                                                          370/329
2017/0019886 A1*  1/2017  Patel ..................... H04W 76/14
(Continued)

FOREIGN PATENT DOCUMENTS

WO       2018084934 A1    5/2018

OTHER PUBLICATIONS

Translation of Written Opinion of the International Searching Authority in connection with International Application No. PCT/KR2019/005883 dated Aug. 23, 2019, 6 pages.
(Continued)

*Primary Examiner* — Wei Zhao

(57) ABSTRACT

According to an embodiment of the disclosure, there is provided a method for performing sidelink communication with a reception user equipment (UE) by a transmission UE in a wireless communication system, the method including: receiving information associated with a resource pool for sidelink communication from a base station through a system information block (SIB); selecting a resource for performing sidelink communication with the reception UE from the resource pool; selecting a demodulation reference signal (DMRS) configuration for performing sidelink communication with the reception UE from among a plurality of DMRS
(Continued)

configurations for sidelink communication; indicating the DMRS configuration to the reception UE; and performing sidelink communication with the reception UE by using the resource and the DMRS configuration.

18 Claims, 10 Drawing Sheets

(51) Int. Cl.
  *H04L 1/00* (2006.01)
  *H04L 5/00* (2006.01)

(56) References Cited

U.S. PATENT DOCUMENTS

| | | |
|---|---|---|
| 2018/0007529 A1 | 1/2018 | Shin et al. |
| 2018/0062809 A1 | 3/2018 | Baghel et al. |
| 2019/0349901 A1* | 11/2019 | Basu Mallick ... H04W 72/0446 |

OTHER PUBLICATIONS

International Search Report and Written Opinion of the International Searching Authority in connection with International Application No. PCT/KR2019/005883 dated Aug. 23, 2019, 10 pages.
Huawei, et al., "Design of DL DMRS for data transmission," R1-1712243, 3GPP TSG RAN WG1 Meeting #90, Prague, Czech Republic, Aug. 21-25, 2017, 8 pages.
LG Electronics, "Remaining details on DMRS for PSCCH and PSSCH," R1-166821, 3GPP TSG RAN WG1 Meeting #86, Gothenburg, Sweden, Aug. 22-26, 2016, 3 pages.

* cited by examiner

FIG. 2
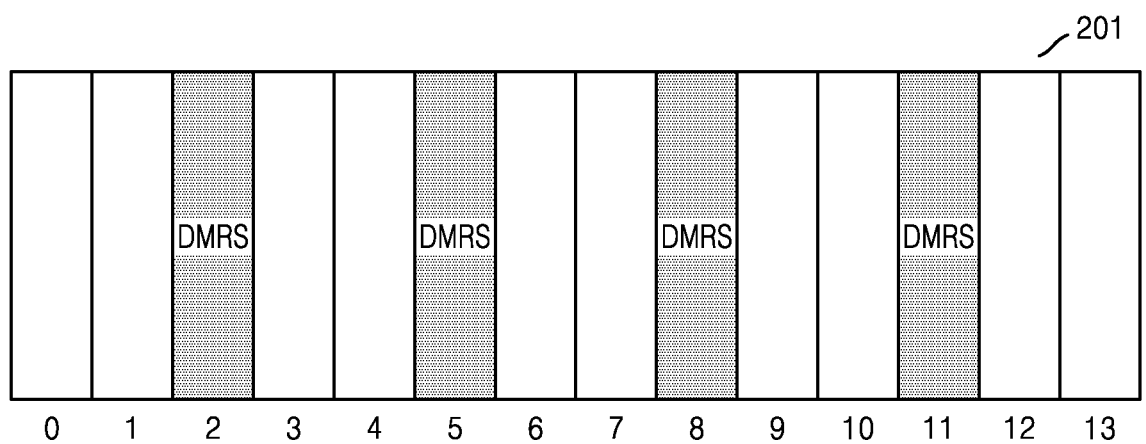
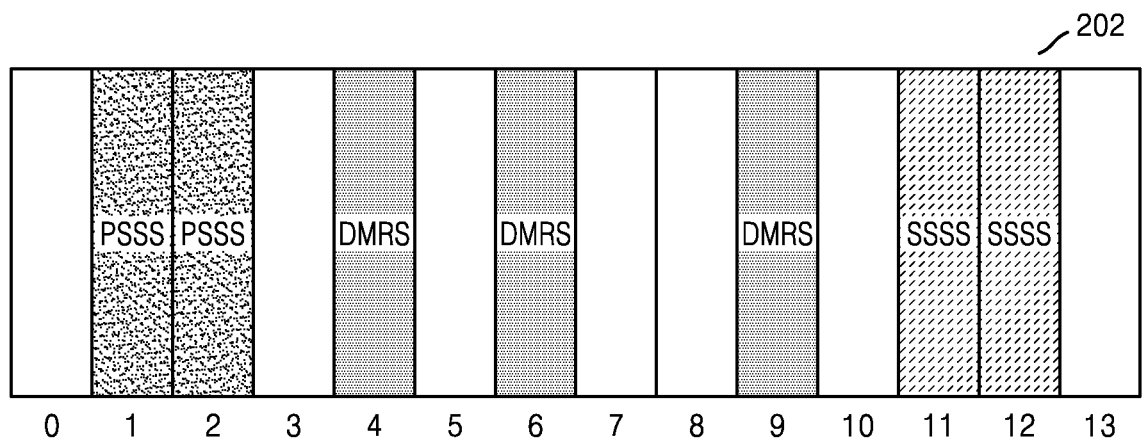

FIG. 4

One symbol pattern 401

| | |
|---|---|
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |

Two symbol pattern 402

| | |
|---|---|
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |

One symbol pattern 403

| | |
|---|---|
| 4/5 | CDM group2 |
| 4/5 | |
| 2/3 | CDM group1 |
| 2/3 | |
| 0/1 | CDM group0 |
| 0/1 | |
| 4/5 | CDM group2 |
| 4/5 | |
| 2/3 | CDM group1 |
| 2/3 | |
| 0/1 | CDM group0 |
| 0/1 | |

Two symbol pattern 404

| | |
|---|---|
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |

METHOD AND APPARATUS FOR CONFIGURING DMRS INFORMATION IN V2X SYSTEM

CROSS-REFERENCE TO RELATED APPLICATIONS

This application is a 371 National Stage of International Application No. PCT/KR2019/005883, filed May 16, 2019, which claims priority to Korean Patent Application No. 10-2018-0056179, filed May 16, 2018, the disclosures of which are herein incorporated by reference in their entirety.

BACKGROUND

1. Field

The disclosure relates to a method and apparatus for configuring demodulation reference signal (DMRS) information in a vehicle-to-everything (V2X) system.

2. Description of Related Art

To meet the increasing demand with respect to wireless data traffic after the commercialization of $4^{th}$ Generation (4G) communication systems, efforts to develop an enhanced $5^{th}$ Generation (5G) communication system or a pre-5G communication system are continuing. For this reason, a 5G communication system or pre-5G communication system is called a Beyond 4G Network communication system or a post long term evolution (LTE) system. The 5G communication system defined in the $3^{rd}$ Generation Partnership Project (3GPP) is called a New Radio (NR) system. To achieve a high data transmission rate, the implementation of 5G communication systems in an ultra-high-frequency (mmWave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antennas have been discussed, and the technologies have been applied to the NR system. Also, to improve the network of the system, various technologies, such as evolved small cell, advanced small cell, cloud radio access network (cloud RAN), ultra-dense networks, device to device (D2D) communication, wireless backhaul, moving networks, cooperative communication, coordinated multi-points (CoMP), and interference cancellation, have been developed for 5G communication systems. In addition, other technologies, such as Hybrid frequency-shift keying (FSK) and quadrature amplitude modulation (QAM) Modulation (FQAM) and sliding window superposition coding (SWSC) based on advanced coding modulation (ACM), and non-orthogonal multiple access (NOMA), sparse code multiple access (SCMA), and filter bank multi carrier (FBMC) being advanced access technology, have been developed for 5G communication systems.

Meanwhile, the Internet is evolving from a human-centered network in which humans generate and consume information to an Internet of Things (IoT) network in which distributed components such as objects transmit and receive information and process it. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new values for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, 5G communication, such as sensor networks, M2M communication, and MTC, is implemented by technologies, such as beam forming, MIMO, and array antenna. Applying a cloud radio access network (cloud RAN) as big data processing technology described above also is an example of the convergence of 5G technology and IoT technology.

As various services are provided with the development of the mobile communication system in addition to the above-described technologies, methods for effectively providing the services are required.

SUMMARY

The disclosed embodiments provide an apparatus and method for effectively providing a service in a mobile communication system.

BRIEF DESCRIPTION OF THE DRAWINGS

FIG. 2 is a diagram for describing demodulation reference signal (DMRS) patterns considered for V2X communication in a $3^{rd}$ Generation Partnership Project (3GPP) Rel-14 LTE system.

FIG. 4 is a diagram for describing DMRS patterns in a $5^{th}$ Generation (5G) or new radio (NR) system.

DETAILED DESCRIPTION

Figure 1:
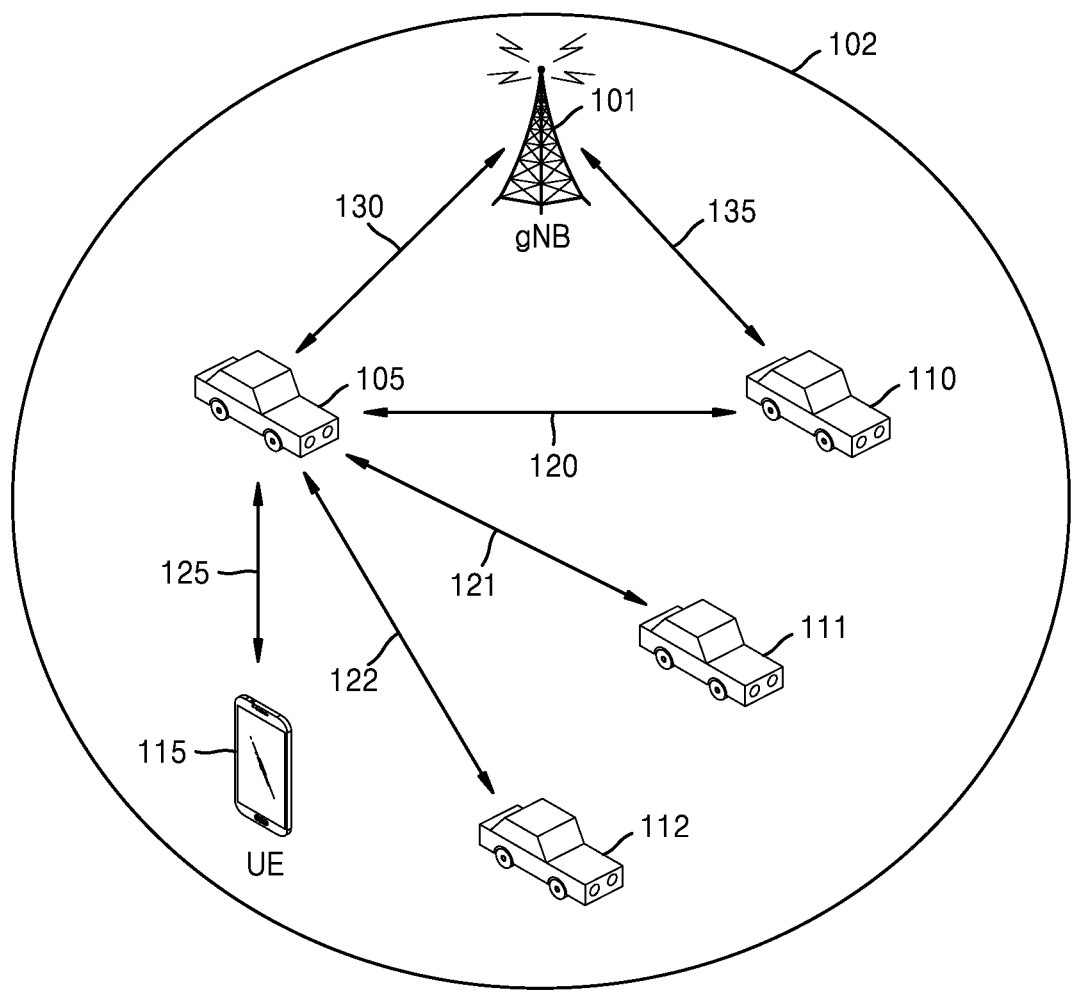
FIG. 1 is a diagram for describing vehicle-to-everything (V2X) communication in a wireless communication system to which an embodiment is applied.

According to an embodiment, a method for configuring demodulation reference signal (DMRS) information of a user equipment (UE) in Vehicle-to-Everything (V2X) communication includes obtaining DMRS configuration information, applying a first default DMRS configuration or a second default DMRS configuration based on the DMRS configuration information, and performing the V2X communication through the first default DMRS configuration or the second default DMRS configuration.

According to an embodiment, a method for performing sidelink communication with a reception user equipment (UE) by a transmission UE in a wireless communication system includes: receiving information associated with a resource pool for sidelink communication from a base station through a system information block (SIB); selecting a resource for performing sidelink communication with the reception UE from the resource pool; selecting a demodulation reference signal (DMRS) configuration for performing sidelink communication with the reception UE from among a plurality of DMRS configurations for sidelink communication; indicating the DMRS configuration to the reception UE; and performing sidelink communication with the reception UE by using the resource and the DMRS configuration.

According to an embodiment of the disclosure, the resource may be assigned through downlink control information (DCI) transmitted via physical downlink control channel (PDCCH) from the base station, or may be selected by the transmission UE from the resource pool.

According to an embodiment of the disclosure, the method may further include setting a radio resource control (RRC) connection to the reception UE, wherein the indicating of the DMRS configuration to the reception UE may include transmitting the DMRS configuration through the RRC connection to the reception UE.

According to an embodiment of the disclosure, the indicating of the DMRS configuration to the reception UE may include transmitting sidelink control information (SCI) including the DMRS configuration via physical sidelink control channel (PSCCH) to the reception UE.

According to an embodiment of the disclosure, the method may further include obtaining mapping information representing which DMRS configuration of the plurality of DMRS configurations each of a plurality of resource pools for sidelink communication corresponds to, the selecting of the DMRS configuration may include selecting, as the DMRS configuration for performing sidelink communication with the reception UE, a DMRS configuration corresponding to the resource pool received through the SIB from among the plurality of resource pools, based on the mapping information, and the mapping information may be received from the base station through the SIB, or may be received through an RRC connection to the base station or another UE other than the UE.

According to an embodiment of the disclosure, the selecting of the DMRS configuration for sidelink communication may include selecting a first DMRS configuration as the DMRS configuration for sidelink communication in case that a sidelink transmission mode of the transmission UE is a broadcast mode, and selecting a second DMRS configuration as the DMRS configuration for sidelink communication in case that the sidelink transmission mode of the transmission UE is a uni-cast mode or a group-cast mode.

According to an embodiment of the disclosure, the first DMRS configuration and the second DMRS configuration may be separated and identified through cyclic redundancy check (CRC) masking for physical sidelink control channel (PSCCH).

According to an embodiment of the disclosure, a transmission User Equipment (UE) for performing sidelink communication with a reception UE in a wireless communication system includes: a transceiver; a memory storing a program; and
a processor configured to execute the program to receive information associated with a resource pool for sidelink communication from a base station through a system information block (SIB), select a resource for performing sidelink communication with the reception UE from the resource pool, select a DMRS configuration for performing sidelink communication with the reception UE from among a plurality of demodulation reference signal (DMRS) configurations for sidelink communication, indicate the DMRS configuration to the reception UE, and perform the sidelink communication with the reception UE by using the resource and the DMRS configuration.

According to an embodiment of the disclosure, a method, performed by a reception user equipment (UE), for identifying a sidelink demodulation reference signal (DMRS) configuration in a wireless communication system includes: obtaining information associated with a resource pool for sidelink communication; identifying a DMRS configuration for sidelink communication with a transmission UE from among a plurality of DMRS configurations for sidelink communication, based on at least one of sidelink control information (SCI) received from the transmission UE via physical sidelink control channel (PSCCH), information configured for the resource pool, or a sidelink transmission mode of the transmission UE; and performing sidelink communication with the transmission UE by using the DMRS configuration.

According to an embodiment of the disclosure, a reception user equipment (UE) for identifying a sidelink demodulation reference signal (DMRS) configuration in a wireless communication system includes: a transceiver; a memory storing a program; and a processor configured to execute the program to obtain information associated with a resource pool for sidelink communication, identify a DMRS configuration for sidelink communication with a transmission UE from among a plurality of DMRS configurations for sidelink communication, based on at least one of sidelink control information (SCI) received from the transmission UE via physical sidelink control channel (PSCCH), information configured for the resource pool, or a sidelink transmission mode of the transmission UE, and perform sidelink communication with the transmission UE by using the DMRS configuration.

Hereinafter, embodiments of the disclosure will be described in detail with reference to the accompanying drawings.

When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some components of the accompanying drawings may be exaggeratedly shown, omitted, or schematically shown. Also, the sizes of the components do not completely reflect their actual sizes. The same or corresponding components in the drawings are assigned like reference numerals.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like elements throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer usable or computer readable memory capable of directing a computer or other programmable data processing equipment to implement the functions in a particular manner so that the instructions stored in the computer usable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more Central Processing Units (CPUs) in a device or a security multimedia card. Also, in the embodiments, the 'portion', 'module' or 'unit' may include one or more processors.

As used herein, the term indicating a connection node, the term indicating network entities, the term indicating messages, the term indicating an interface between network entities, the term indicating various identification information, etc. are examples for convenience of description. Accordingly, the disclosure is not limited to the terms which will be described later, and other terms having equivalent technical meanings may be used.

Hereinafter, for convenience of description, terms and names defined in specifications for $5^{th}$ Generation (5G), New Radio (NR), or Long Term Evolution (LTE) systems may be used in the disclosure. However, the disclosure is not limited to these terms and names, and may also be applied to systems based on other specifications.

The following detailed descriptions about the embodiments of the disclosure are mainly targeted to communication specifications defined by the $3^{rd}$ Generation Partnership Project (3GPP). However, the main gist of the disclosure may be applied to other communication systems having similar technical backgrounds through slight modifications within a range that does not greatly deviate from the scope of the disclosure, under a determination of a person having a skilled technical knowledge.

FIG. 1 is a diagram for describing Vehicle-to-Everything (V2X) communication in a wireless communication system to which an embodiment is applied.

Vehicle-to-Everything (V2X) communication means communication between vehicles and every interfaces. V2X communication may include Vehicle-to-Vehicle (V2V), Vehicle-to-Infrastructure (V2I), Vehicle-to-Pedestrian (V2P), etc. according to its type and configuration components Basically, V2P and V2V are based on configurations and operation principles of device-to-device (D2D) defined in a 3GPP LTE Rel-13 standard.

Referring to FIG. 1, a base station 101 (e.g., next-generation Node B (gNB)) may cover one or more vehicle UEs 105, 110, 111, and 112 and a pedestrian mobile UE 115 located in a cell 102 supporting V2X communication. The vehicle UEs 105 and 110 may perform cellular communication with the gNB 101 by using links Uu 130 and 135 between the vehicle UEs 105 and 110 and the gNB 101, and perform D2D communication with the other vehicle UEs 111 and 112 or the pedestrian mobile UE 115 by using sidelinks 120, 121, 122, and 125. For the vehicle UE 105 to itself transmit/receive information to/from the other vehicle UEs 110, 111 and 112 and the pedestrian mobile UE 115 by using the sidelinks 120, 121, 122, and 125, the gNB 101 may assign a resource pool that is available for sidelink communication.

In a LTE system, methods for assigning resources for V2X sidelink communication to UEs in a gNB are classified into two of scheduled resource assignment (mode 3) and UE autonomous resource assignment (mode 4).

The scheduled resource assignment is a method in which a gNB assigns resources for sidelink transmission to UEs Radio Resource Control (RRC)-connected to the gNB by a dedicated scheduling method. Because the gNB can manage resources of a sidelink, the scheduled resource assignment (mode 3) may be effective in interference management and resource pool management (for example, dynamic assignment and semi-persistence transmission). Also, in the scheduled resource assignment (mode 3) in which the gNB assigns and manages resources for V2X communication, when a UE RRC-connected to the gNB has data to transmit to other UEs, the UE may transmit an RRC message or a MAC control element (CE) to the gNB to request a resource. Herein, the RRC message may include a SidelinkUEInformation message and a UEAssistanceInformation message. Meanwhile, the MAC CE may include, for example, a buffer state report MAC CE, etc. of a new format (at least including an indicator indicating a buffer state report for V2P communication and information about a size of data buffered for D2D communication). Detailed formats and content about buffer state reports used in the 3GPP are disclosed in the 3GPP specification TS36.321 "E-UTRA MAC Protocol Specification".

In the UE autonomous resource assignment, a gNB may provide a sidelink transmission/reception resource pool for V2X communication as system information, and a UE may select a resource pool according to a defined rule. The resource selection method may include zone mapping, sensing-based resource selection, random selection, etc.

FIG. 2 is a diagram for describing demodulation reference signal (DMRS) patterns considered for V2X communication in a 3GPP Rel-14 LTE system.

V2X communication needs to secure reception performance of UEs even in a high-speed movement environment, because the V2X communication is communication with vehicles. Accordingly, as shown in FIG. 2, a LTE system may assign 4 DMRSs to symbol indices {2,5,8,11}, respectively, for Physical Sidelink Control Channel (PSCCH, a control channel) and Physical Sidelink Shared Channel (PSSCH, a data channel), and assign 3 DMRSs, except for symbols for a Primary Sidelink Synchronization Signal (PSSS) and a Secondary Sidelink Synchronization Signal (SSSS), to symbol indices {4,6,9} (or, {5,7,10}, etc.), respectively, for Physical Sidelink Broadcast Channel (PSBCH, a broadcast channel). That is, a DMRS configuration is designed to secure channel estimation performance and frequency offset estimation performance of a sidelink by reducing intervals between DMRS symbols as possible. Also, because services using V2X communication exchange information related to vehicle safety, a delay time of transmission/reception may need to be minimized to within a range capable of securing safety between vehicles. This will be described with reference to FIG. 3.

Figure 3:
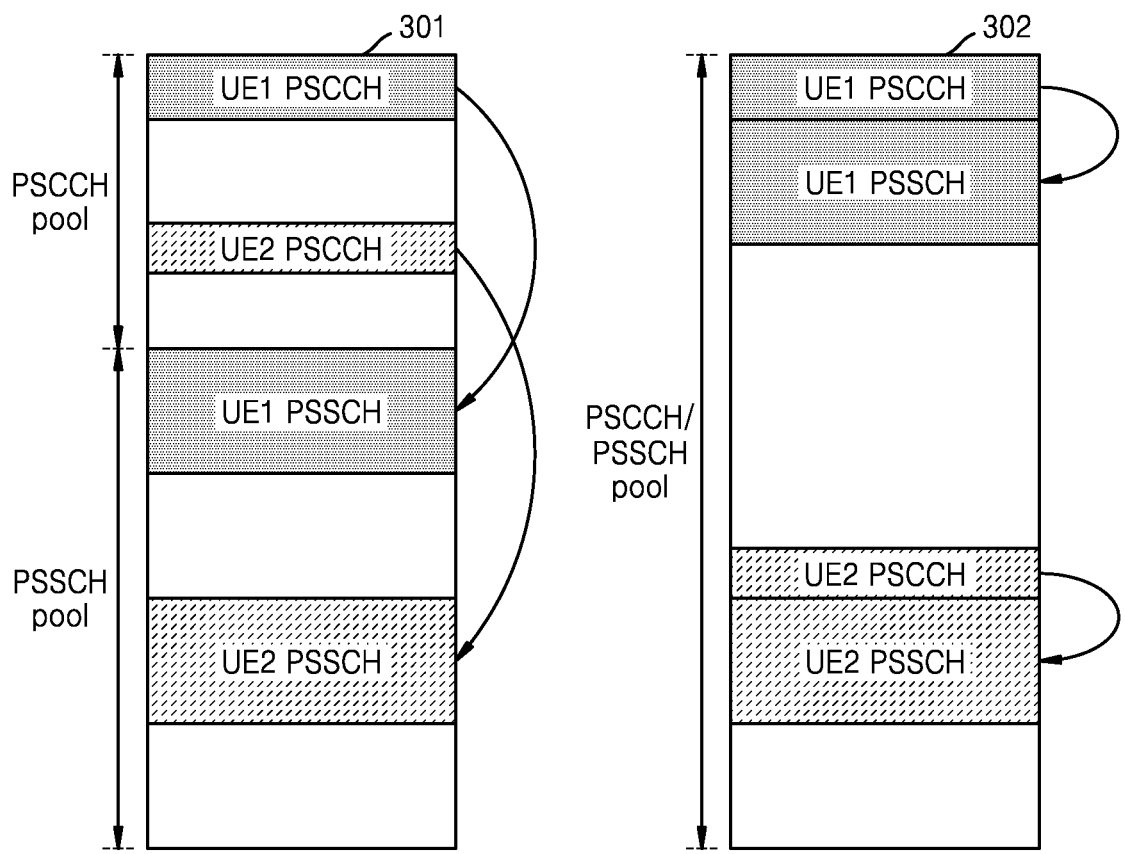
FIG. 3 is a diagram for describing a method for reducing a delay time of V2X communication in a 3GPP Rel-14 LTE system.

FIG. 3 is a diagram for describing a method for reducing a delay time of V2X communication in a 3GPP Rel-14 LTE system.

Referring to FIG. 3, a Frequency Division Multiplexing (FDM) method of transmitting a data channel and a control channel simultaneously at different frequency areas in the same sub frame is shown. As such, by receiving and processing a data channel and a control channel simultaneously, a delay time may be reduced. More specifically, FIG. 3 illustrates two methods of assigning PSCCH and PSSCH by FDM. 301 shows a non-adjacent assignment method of separating an assignment resource area for PSCCH from an assignment resource area for PSSCH in a sub frame to support transmission/reception of a plurality of V2X UEs, and 302 shows an adjacent assignment method of unremittedly assigning PSCCH and PSSCH in a sub channel to support transmission/reception of a plurality of V2X UEs.

FIG. 4 is a diagram for describing DMRS patterns in a 5G or NR system.

Referring to FIG. 4, a 5G or NR system supports two DMRS patterns. 401 and 402 represent DMRS type 1, wherein 401 represents a one-symbol pattern, and 402 represents a two-symbol pattern. The DMRS type 1 of 401 and 402 may be DMRS patterns of a comb 2 structure, and may be configured with two CDM groups. Different CDM groups may be subject to FDM. More specifically, in 401 and 402, CDM group 0 and CDM group 1 are shown. In the one-symbol pattern of 401, the same CDM group may be subject to frequency domain CDM to be divided into and identified as two DMRS ports, and accordingly, a total of 4 orthogonal DMRS ports may be configured. 401 shows DMRS port IDs mapped to individual CDM groups (in a downlink, DMRS port ID is expressed by applying +1000 to a shown number). In the two-symbol pattern of 402, time/frequency domain CDM may be applied to the same CDM group to be divided into and identified as four DMRS ports, and accordingly, a total of 8 orthogonal DMRS ports may be configured. In 402, DMRS port IDs mapped to individual CDM groups are shown (in a downlink, DMRS port ID is expressed by applying +1000 to a shown number).

In contrast, the DRMS type 2 of 403 and 404 may be DMRS patterns having a structure in which FD-OCC is applied to subcarriers being adjacent to each other on frequency, and may be configured with three CDM groups. Different CDM groups may be subject to FDM. More specifically, in 403 and 404, CDM group 0, CDM group 1, and CDM group 2 are shown. In the one-symbol pattern of 403, frequency domain CDM may be applied to the same CDM group to be divided into and identified as two DMRS ports, and accordingly, a total of 6 orthogonal DMRS ports may be configured. In 403, DMRS port IDs mapped to individual CDM groups are shown (in a downlink, DMRS port ID is expressed by applying +1000 to a shown number). In the two-symbol pattern of 404, time/frequency domain CDM may be applied to the same CDM group to be divided into and identified as four DMRS ports, and accordingly, a total of 12 orthogonal DMRS ports may be configured. In 404, DMRS port IDs mapped to individual CDM groups are shown (in a downlink, DMRS port ID is expressed by applying +1000 to a shown number).

As described above, in the 5G or NR system, different two DMRS patterns 401 and 402 or 403 and 404 may be configured, and whether a DRMS pattern is a one-symbol pattern (401 and 403) or a two adjacent symbol pattern (402 and 404) may also be set. Also, DMRS port numbers may be scheduled, and the number of CDM groups scheduled together for PDSCH rate matching may be set and signaled. Also, in CP-OFDM, all of two DMRS patterns as described above may be supported in DL and UL, and in DFT-S-OFDM, only the DMRS type 1 of the above-described DMRS patterns may be supported in UL. Also, an additional DMRS may be supported to be configurable. A front-loaded DMRS indicates a first DMRS appearing in a temporally foremost symbol, and an additional DMRS indicates a DMRS appearing in a symbol following the front-loaded DMRS. In the 5G or NR system, the number of additional DMRSs may be configurable to be from a minimum of 0 to a maximum of 3. Also, when an additional DMRS is configured, the same pattern as a front-loaded DMRS may be assumed. More specifically, when, in regard of a front-loaded DMRS, information about whether a DMRS pattern of the front-loaded DMRS is type 1 or type 2, information about whether the DMRS pattern is a one-symbol pattern or a two adjacent symbol pattern, and information about a DMRS port and the number of used CDMS groups are indicated, and an additional DMRS is additionally configured, the same DMRS information as that of the front-loaded DMRS may be configured for the additional DMRS. In the 5G or NR system, a DMRS pattern may be flexibly configured compared to the LTE system. In the 5G or NR system, configuration information for a DMRS pattern may be generally as follows.

Whether the DMRS pattern is type1 or type2 may be set in (or, by) RRC.
dmrs-Type E {1,2}
Information about whether a front-loaded DMRS pattern is a one-symbol pattern or a two adjacent symbol pattern may be set as information of maximum length of a DMRS symbol in RRC.
DMRS-max-len∈{1,2}
The number of additional DMRSs may be set in (or, by) RRC.
dmrs-Additional∈{0,1,2,3}
DMRS port numbers and the number of CDM groups are indicated through Downlink Control Information (DCM).

In a LTE system, as described above with reference to FIG. 1, when the vehicle UEs 105 and 110 perform D2D communication with the other vehicle UEs 111 and 112 or the pedestrian mobile UE 115 by using the sidelinks 120, 121, 122, and 125, the vehicle UE 105 may transmit data simultaneously to a plurality of unspecific nodes 110, 111, 112, and 115 through broadcast. However, in a 5G or NR system, the vehicle UE 105 may transmit data to a single specific node through uni-cast or to a plurality of specific nodes through group-cast. For example, uni-cast and group-cast technologies may be effectively used in consideration of a service scenario such as Platooning which is technology of connecting two or more vehicles to a network to group and move them. More specifically, uni-cast communication may be needed for a purpose for controlling a leader node of a group connected through Platooning to control a specific node, and group-cast communication may be needed for a purpose for simultaneously controlling a group configured with a plurality of specific nodes. Particularly, in the Platooning, a relative velocity between nodes is very low, and accordingly, it may be inefficient to determine a DMRS pattern of a sidelink by reducing intervals between DMRS symbols as possible only in consideration of a high-speed movement environment of V2X communication, like the LTE system. Also, a method for configuring a DMRS pattern being suitable for a V2X communication scenario by considering a flexible DMRS pattern configuration considered in the 5G or NR system is needed.

Hereinafter, various sidelink transmission modes that can be considered in the 5G or NR system will be described. According to an embodiment, a transmission mode of a sidelink may be configured by considering uni-cast or group-cast together as well as broadcast. Also, a method for configuring DMRS information for PSCCH and PSSCH based on the sidelink transmission mode will be described. According to an embodiment, two different default DMRSs may be configured. Also, a method for configuring only one default DMRS and following a DMRS configuration set in (or, by) RRC when the default DMRS configuration is not used will be described. In addition, a method for configuring a default DMRS configuration according to an uplink transmission waveform will be described.

Figure 5:
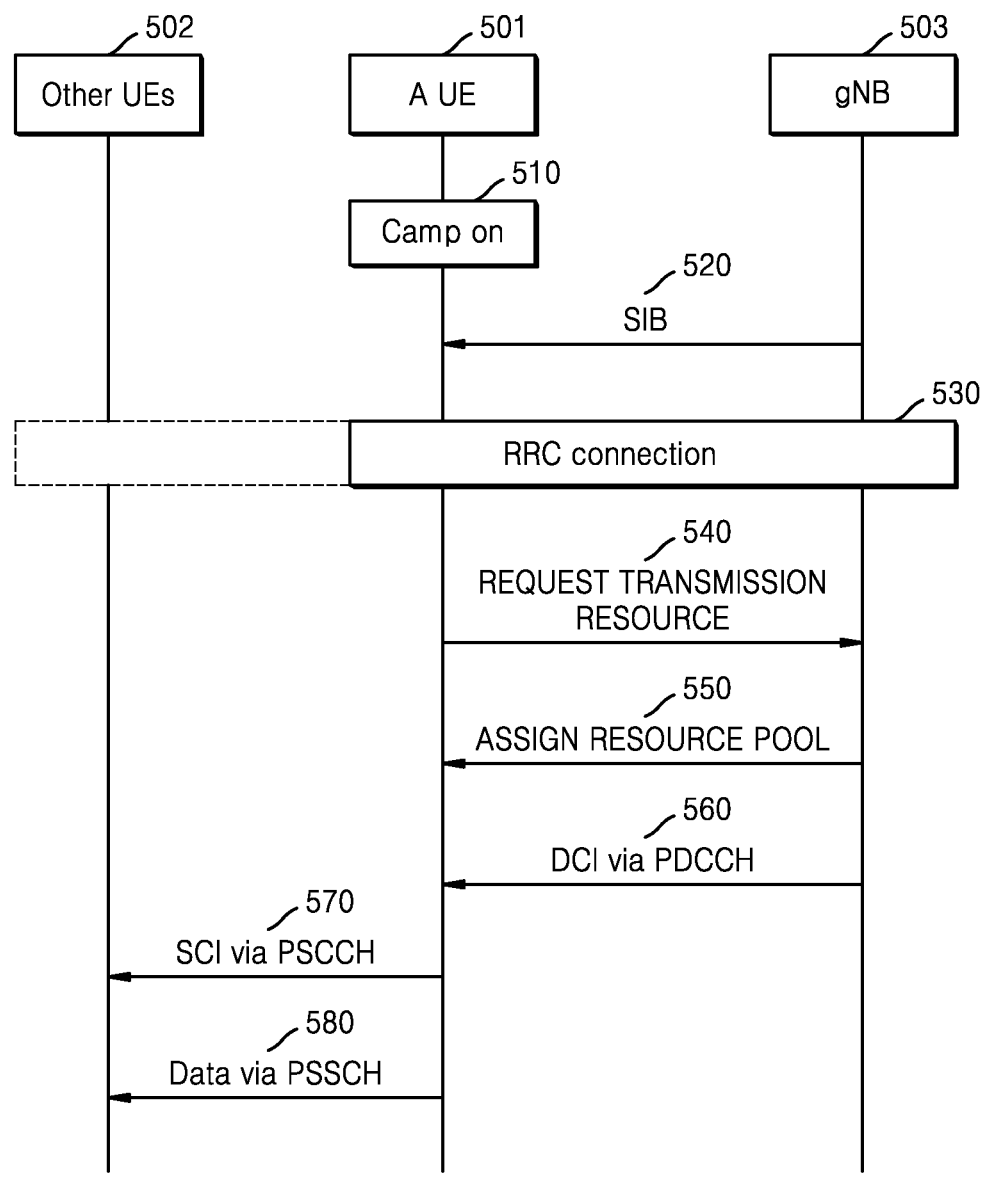
FIG. 5 illustrates a data transmission procedure of a V2X user equipment (UE) in a sidelink transmission mode for broadcast, according to an embodiment.
Figure 6:
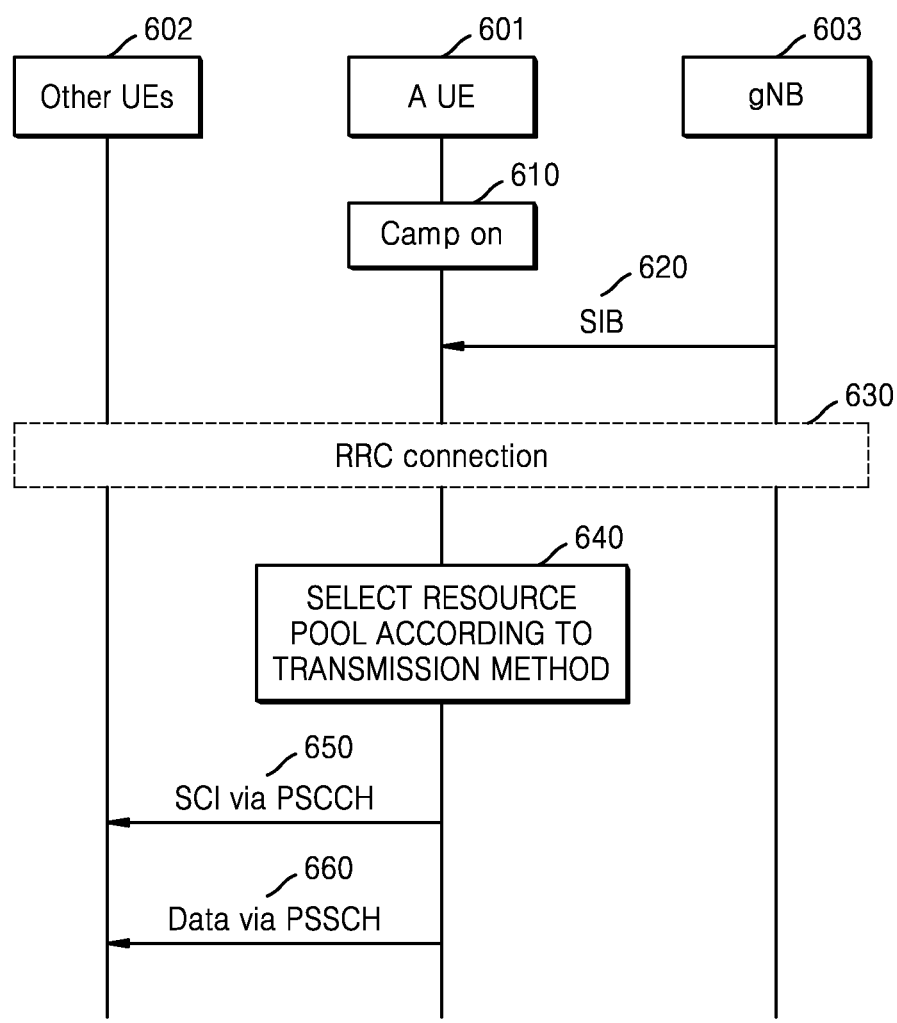
FIG. 6 illustrates a data transmission procedure of a V2X UE in a sidelink transmission mode for broadcast, according to another embodiment.
Figure 7:
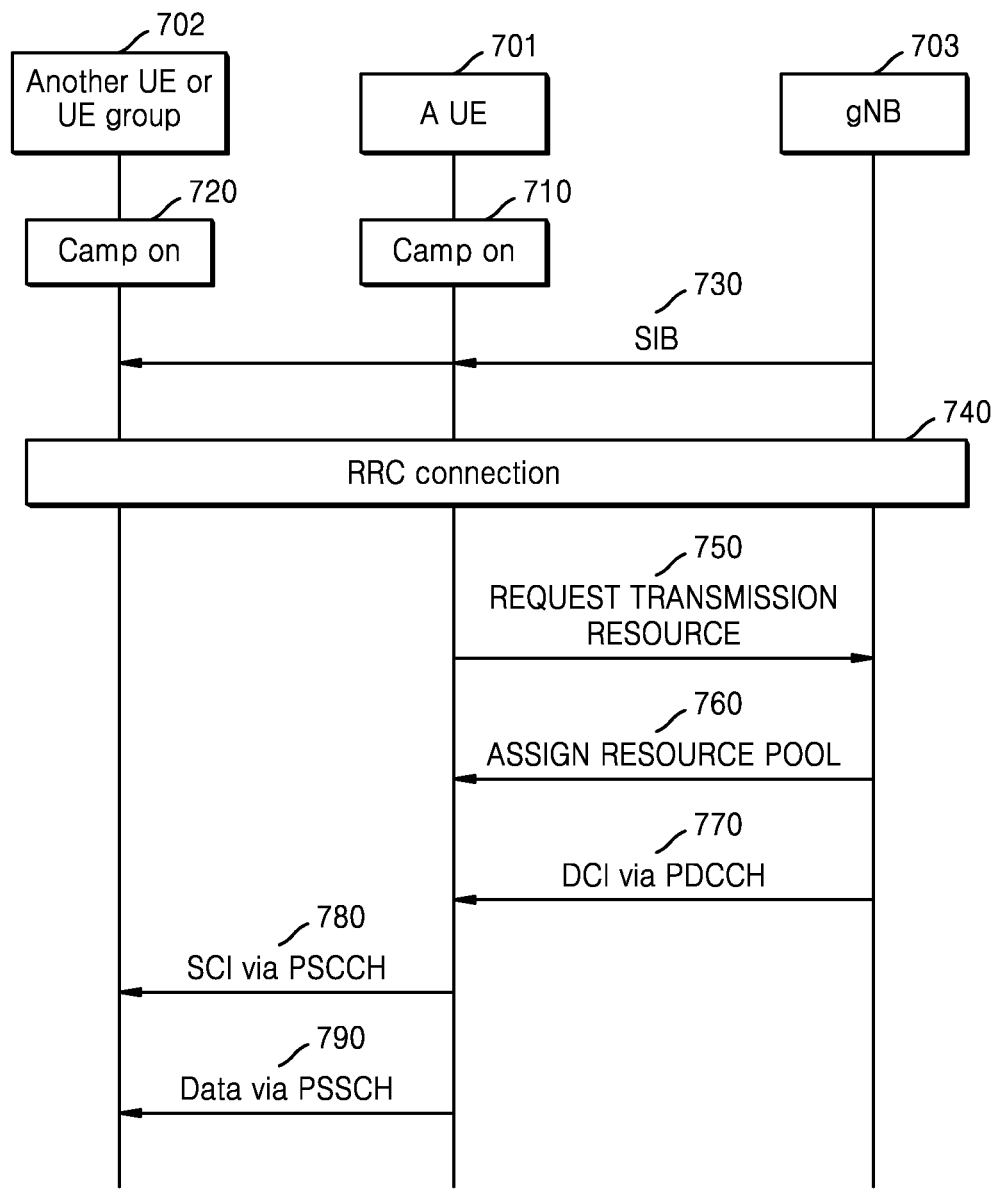
FIG. 7 illustrates a data transmission procedure of a V2X UE in a sidelink transmission mode additionally considering uni-cast or group-cast together with broadcast, according to an embodiment.
Figure 8:
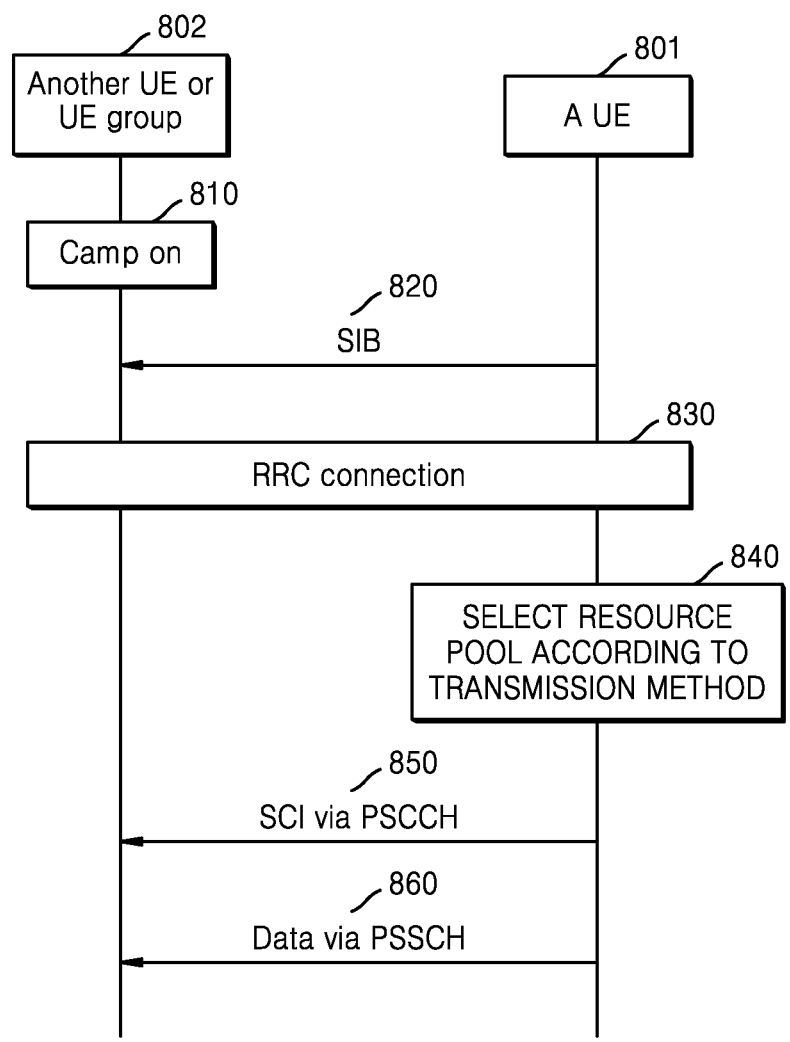
FIG. 8 illustrates a data transmission procedure of a V2X UE in a sidelink transmission mode additionally considering uni-cast or group-cast together with broadcast, according to another embodiment.

According to an embodiment, the 5G or NR system may include various sidelink transmission modes. More specifically, the sidelink transmission modes may include uni-cast or group-cast as well as broadcast. Some embodiments will be described with reference to FIGS. 5 to 8. FIGS. 5 and 6 illustrate a sidelink transmission mode considering only broadcast, and FIGS. 7 and 8 illustrate a sidelink transmission mode considering uni-cast or group-cast together as well as broadcast.

FIG. 5 illustrates a data transmission procedure of a V2X UE in a sidelink transmission mode for broadcast according to an embodiment.

Referring to FIG. 5, in operation 510, a UE 501 may be in a camp-on state. In operation 520, the UE 501 being in the camp-on state may receive a System Information Block (SIB) from a gNB 503. According to an embodiment, the system information in the SIB may include resource pool information for transmission/reception, configuration information for sensing operation, information for establishing synchronization, information for inter-frequency transmission/reception, etc. In operation 530, when data traffic for V2X communication is generated in the UE 501, the UE 501 may set (e.g., configure, establish, re-establish, resume, etc.) an RRC connection to the gNB 503. According to an embodiment, an RRC connection process may be performed before data traffic is generated.

Then, in operation 540, the UE 501 may request the gNB 503 to send a transmission resource for V2X communication with other UEs 502. According to an embodiment, the UE 501 may use an RRC message or a MAC CE to request the gNB 503 to send a transmission resource. Herein, the RRC message may include a SidelinkUEInformation message and a UEAssistanceInformation message. The MAC CE may be, for example, a buffer state report MAC CE, etc. of a new format (at least including an indicator indicating a buffer state report for V2X communication and information about a size of data buffered for D2D communication). According to an embodiment, the gNB 503 may assign a V2X transmission resource to the UE 501 through a dedicated RRC message. The dedicated RRC message may be included in an RRCConnectionReconfiguration message. According to an embodiment, the resource to be assigned may be a V2X resource through Uu or a resource for PC5 according to a kind of traffic that is requested by the UE 501 or a congestion/non-congestion of the corresponding link. According to an embodiment, the UE 501 may transmit ProSe Per Packet Priority (PPPP) of V2X traffic or LCD information together through the UEAssistanceInformation message or MAC CE. The gNB 503 may determine resource assignment based on the PPPP of V2X traffic or LCID information received from the UE 501. In operation 550, the gNB 503 may assign a resource pool to the UE 501. According to an embodiment, because the gNB 503 knows information about resources used by the other UEs 502, the gNB 503 may assign an available resource pool among the resource requested by the UE 501 to the UE 501. Also, in operation 560, the gNB 503 may indicate final scheduling to the UE 501 by DCI transmission via PDCCH.

In operation 570, the UE 501 may broadcast Sidelink Control Information (SCI) to the other UEs 502 via PSCCH. Thereafter, in operation 580, the UE 501 may broadcast data to the other UEs 502 via PSSCH.

FIG. 6 illustrates a data transmission procedure of a V2X UE in a sidelink transmission mode for broadcast according to another embodiment.

Unlike FIG. 5 in which a gNB itself is involved in resource assignment, FIG. 6 shows an operation in which a UE 601 selects a resource based on a resource pool received in advance through system information and transmits data.

Referring to FIG. 6, in operation 610, the UE 601 may be in a camp-on state. In V2X communication, the gNB 603 may assign various kinds of resource pools (a V2V resource pool and a V2P resource pool) for the UE 601. The resource pools may be configured with at least one resource pool from which a UE can autonomously select an available resource pool after sensing resources used by other nearby UEs, at least one resource pool from which a UE randomly selects a resource, etc. In operation 620, the UE 601 being in the camp-on state may receive a SIB from the gNB 603. According to an embodiment, the system information in the SIB may include resource pool information for transmission/reception, configuration information for sensing operation, information for establishing synchronization, information for inter-frequency transmission/reception, etc.

Then, in operation 640, the UE 601 may select a resource pool. According to an embodiment, when data traffic for V2X is generated in the UE 601, the UE 601 may select a resource pool of a time/frequency domain, according to a set transmission operation (one-time transmission of dynamic assignment, multiple transmissions of dynamic assignment, one-time transmission based on sensing, multiple transmissions based on sensing, and random transmission) among the resource pools received through the SIB from the gNB 603.

The procedure of FIG. 6 may operate even in an idle mode in which there is no RRC connection, unlike the procedure of FIG. 5 in which the gNB 503 and the UE 501 operate in an RRC-connected state. Further, even in an RRC-connected state of operation 630, the gNB 603 may allow the UE 601 to autonomously select a transmission resource, without itself being involved in resource assignment, In operation 650, the UE 601 may broadcast the SCI to other UEs 602 via PSCCH. Thereafter, the UE 601 may broadcast data to the other UEs 602 via PSSCH.

FIG. 7 illustrates a data transmission procedure of a V2X UE in a sidelink transmission mode additionally considering uni-cast or group-cast together with broadcast, according to an embodiment.

In operations 710 and 720, a UE 701 and another UE/UE group 702 may be in a camp-on state. In operation 730, the UE 701 or the other UE/UE group 702 may receive a SIB from a gNB 703. According to an embodiment, the system information in the SIB may include resource pool information for transmission/reception, configuration information for sensing operation, information for establishing synchronization, information for inter-frequency transmission/reception, etc.

In operation 740, when data traffic for V2X communication is generated in the UE 701, the UE 701 may set (e.g., configure, establish, re-establish, resume, etc.) an RRC connection to the gNB 703. According to an embodiment, V2X communication may operate in a sidelink transmission mode considering uni-cast or group-cast together. Unlike FIG. 5 illustrating the sidelink transmission mode considering only broadcast, the other UE/UE group 702 performing communication through a sidelink, as well as the UE 701, may also set an RRC connection to the gNB 703. In a service scenario such as Platooning, the UE 701 may function as a leader node, and the leader node may control another UE or one of the UE group 702 connected via a sidelink through uni-cast, or control the UE group 702 through group-cast. According to an embodiment, an RRC connection process may be performed before data traffic is generated.

Thereafter, in operation 750, the UE 701 may request the gNB 703 to send a transmission resource for performing V2X communication with the other UE/UE group 702. According to an embodiment, the UE 701 may use an RRC message or a MAC CE to request the gNB 703 to send a transmission resource. Herein, the RRC message may include a SidelinkUEInformation message and a UEAssistanceInformation message. The MAC CE may include, for example, a buffer state report MAC CE, etc. of a new format (at least including an indicator indicating a buffer state report for V2X communication and information about a size of data buffered for D2D communication). According to an embodiment, the gNB 703 may assign a V2X transmission resource to the UE 701 through a dedicated RRC message. The dedicated RRC message may be included in an RRCConnectionReconfiguration message. According to an embodiment, the resource to be assigned may be a V2X resource through Uu or a resource for PC5 according to a kind of traffic that is requested by the UE 701 or a congestion/non-congestion of the corresponding link. According to an embodiment, the UE 701 may transmit PPPP of V2X traffic or LCID information together through the UEAssistanceInformation message or MAC CE. The gNB 703 may determine resource assignment based on the PPPP of V2X traffic or LCID information received from the UE 701. In operation 760, the gNB 703 may assign a resource pool to the UE 701. According to an embodiment, because the gNB 703 knows information about resources used by other UEs, the gNB 703 may assign an available resource pool among the resource requested by the UE 701 to the UE 701. Also, in operation 770, the gNB 703 may indicate final scheduling to the UE 701 through DCI transmission via PDCCH.

In operation 780, the UE 701 may broadcast, group-cast, or uni-cast SCI to the other UE/UE group 702 via PSCCH. Thereafter, in operation 790, the UE 701 may broadcast, group-cast, or uni-cast data to the other UE/UE group 702 via PSSCH.

FIG. 8 illustrates a data transmission procedure of a V2X UE in a sidelink transmission mode additionally considering uni-cast or group-cast together with broadcast, according to another embodiment.

Unlike the procedure of FIG. 7 in which a gNB itself is involved in resource assignment, a sidelink transmission mode that operates without any involvement of a gNB will be described with reference to FIG. 8. A scenario shown in FIG. 8 may be to support V2X when a UE is out of coverage of a gNB. Also, unlike the procedure of FIG. 7 in which a gNB itself is involved in resource assignment, FIG. 8 illustrates an operation in which a UE 801 being a leader UE autonomously selects a resource based on a preset resource pool and transmits data. According to an embodiment, the preset resource pool may include pool information set when the UE 801 has been connected to a gNB.

In operation 810, another UE/UE group 802 may be in a camp-on state. In operation 820, the UE 801 may transmit system information to the other UE/UE group 802. According to an embodiment, the UE 801 may be a leader UE. According to an embodiment, the leader UE may perform a function that is similar to that of a gNB to perform an initial access operation on the other UE/UE group 802 or transmit a SIB to the other UE/UE group 802 being in the camp-on state. According to an embodiment, the system information may include resource pool information for transmission/reception, configuration information for sensing operation, information for establishing synchronization, information for inter-frequency transmission/reception, etc.

In operation 830, when data traffic for V2X communication is generated in the UE 801, the UE 801 may set (e.g., configure, establish, re-establish, resume, etc.) an RRC connection to the other UE/UE group 802. According to an embodiment, V2X communication may operate in a sidelink transmission mode considering uni-cast or group-cast together. In a service scenario such as Platooning, the UE 801 may function as a leader node, and the leader node may control another UE or one of the UE group 802 connected via a sidelink through uni-cast, or control the UE group 802 through group-cast.

In operation 840, the UE 801 may select a resource pool. According to an embodiment, when data traffic for V2X is generated in the UE 601, the UE 801 may select a resource pool of a time/frequency domain, according to a set transmission operation (one-time transmission of dynamic assignment, multiple transmissions of dynamic assignment, one-time transmission based on sensing, multiple transmissions based on sensing, and random transmission) among preset resource pools.

In operation 850, the UE 801 may broadcast, group-cast, or uni-cast the SCI to the other UE/UE group 802 via PSCCH. Thereafter, the UE 801 may broadcast, group-cast, or uni-cast data to the other UE/UE group 802 via PSSCH, in operation 860.

Hereinafter, a method for configuring DMRS information for PSCCH and PSSCH based on the above-described sidelink transmission mode will be described with reference to FIG. 9.

Figure 9:
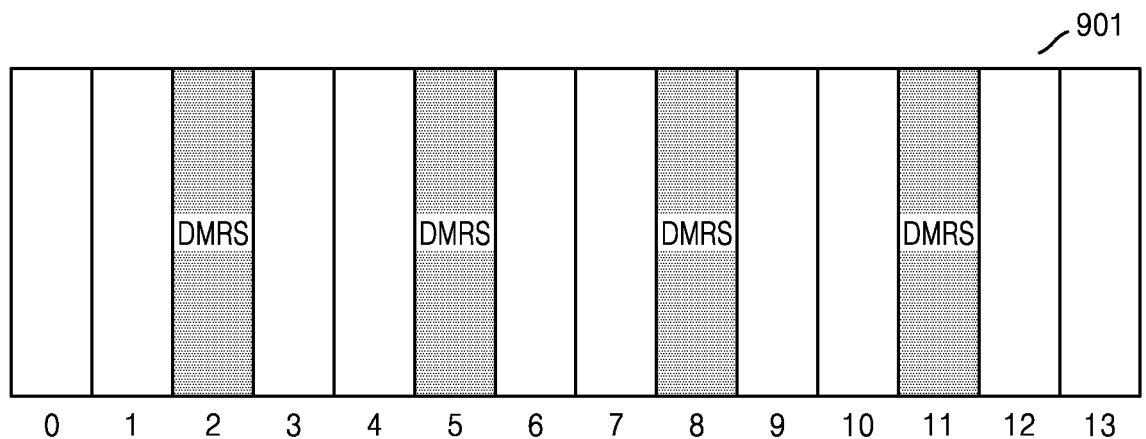
FIG. 9 is a diagram for describing default DMRS patterns according to an embodiment.

FIG. 9 is a diagram for describing a default DMRS pattern according to an embodiment.

Referring to FIG. 9, according to an embodiment, two different default DMRSs may be configurable. As described above, V2X communication needs to secure reception performance of UEs even in a high-speed movement environment, because the V2X communication is communication between vehicles. LTE V2X communication has supported, as a DMRS configuration of a sidelink, only a fixed default DRMS configuration of assigning four DMRSs for PSCCH and PSSCH to symbol indices {2,5,8,11}. However, the method may be unsuitable for a service scenario such as Platooning considered in a 5G or NR system. In the Platooning, a relative velocity between UEs may be very low, and accordingly, in this case, four DMRS symbols may generate unnecessary RS overhead.

In FIG. 9, 901 represents a fixed default DMRS configuration of assigning four DMRSs to symbol indices {2,5,8, 11} in consideration of a high-speed movement environment, and 902 represents another fixed default DMRS configuration of assigning two DMRSs to symbol indices {2,11} in consideration of a case in which a velocity between UEs is relatively low. As shown in 902, the case in which DMRS symbols are assigned to more distant positions with respect to each other, as shown in 902, may be advantageous for channel estimation. More specifically, by assigning DMRS symbols to both ends of a slot as possible, accuracy of time domain channel interpolation upon channel estimation may increase, thereby improving channel estimation performance. FIG. 9 illustrates a position configuration of two different default DMRS symbols. However, the default DMRS configuration may change.

According to an embodiment, a method of configuring two different default DMRSs may be as follows.

Method of using SCI

Method of using a resource pool configuration

Method of following a broadcast/uni-cast/group-cast configuration

Hereinafter, detailed operations and differences for the three methods will be described.

According to an embodiment, in the method of using SCI, two different default DMRS configurations may be signaled through SCI. Operation 570 of FIG. 5, operation 650 of FIG. 6, operation 780 of FIG. 7, and operation 850 of FIG. 8 in the data transmission procedures of a V2X UE as described above correspond to an operation of signaling SCI. In the method of using SCI, a DMRS configuration may be signaled through SCI transmitted via PSCCH. Accordingly, a default DMRS configuration for PSCCH may be fixed, and one of the two default DMRS configurations may be indicated through PSSCH. According to an embodiment, a default DMRS configuration for PSCCH may be a DMRS configuration considering a worst case, and a DMRS configuration for PSSCH may be determined to be a default DMRS configuration indicated through SCI. According to an embodiment, in the method of using SCI, one of a 4-symbol DMRS pattern and a 2-symbol DMRS pattern as shown in FIG. 9 may be indicated through 1-bit SCI. In this case, as described above, a DMRS for PSCCH may be always fixed to a 4-symbol pattern, and whether a DMRS pattern for PSSCH is a 2-symbol pattern or a 4-symbol pattern may be indicated by SCI.

According to another embodiment, detailed configurations for default DMRS patterns may be included in RRC or SIB, and a configuration for one of the patterns may be indicated through 1-bit SCI. In this case, other DMRS configuration information, such as whether a DMRS pattern is type 1 or type 2 and the number of additional DMRSs, as well as symbol position information for default DMRS, may be indicated. In this case, as described above, a default DMRS configuration for PSCCH may be a DMRS pattern considering the worst case among DMRS patterns set in (or, by) the RRC or SIB, and a DMRS pattern for PSSCH may be indicated to one of the two default DMRS patterns by the SCI.

According to an embodiment, in the method of using a resource pool configuration, a default DRMS configuration may be indicated by connecting a default DMRS configuration to a resource pool configuration for V2X communication. As described above, for a specific vehicle UE to itself transmit/receive information to/from another vehicle UE and a pedestrian mobile UE by using a sidelink, a gNB may need to assign a resource pool that can be used for sidelink communication. In the method of using a resource pool configuration, two default DMRS configurations may be identified by each resource pool corresponding to each default DMRS configurations, respectively. For example, a resource pool may be divided into a plurality of resource pools, and any one of two default DMRS configurations may be mapped to each resource pool. Accordingly, in the case of being assigned a specific resource pool, a default DMRS configuration mapped to the specific resource pool may be determined together. As described above, because resource pool information can be configured through a SIB or RRC configuration, which resource pool uses which DMRS configuration may be set through a SIB or RRC configuration in order to use a resource pool configuration. At this time, the default DMRS configuration through the SIB or RRC configuration may indicate other DMRS configuration information, etc., such as whether a DMRS pattern is type 1 or type 2 and the number of additional DMRSs, as well as symbol position information for a default DMRS, etc. In the method of using a resource pool configuration, because a default DMRS configuration is made through a SIB or RRC configuration, it may be possible to indicate one of the two default DMRS configurations for both PSCCH and PSSCH, unlike the method of using SCI. Operation 550 of FIG. 5, operation 640 of FIG. 6, operation 760 of FIG. 7, and operation 840 of FIG. 8 in the data transmission procedures of a V2X UE as described above may correspond to an operation of selecting a resource pool. As described above, the sidelink transmission mode of operation 550 of FIG. 5 and operation 760 of FIG. 7 is a method in which a gNB itself is involved in resource assignment, and a default DMRS configuration may be determined as a default DMRS configuration configured for a resource pool set in operation 550 of FIG. 5 and operation 760 of FIG. 7. The sidelink transmission mode of operation 640 of FIG. 6 and operation 840 of FIG. 8 is a method in which a UE autonomously selects a resource pool, and a default DMRS configuration may be determined as a default DMRS configuration configured for a resource pool set in operation 640 of FIG. 6 and operation 840 of FIG. 8.

Finally, the method of following a broadcast/uni-cast/group-cast configuration may implicitly determine a default DMRS configuration according to a broadcast/uni-cast/group-cast configuration. As described above, a LTE system supports V2X communication through a sidelink in such a way to send data simultaneously to a plurality of unspecific nodes through broadcast. However, a 5G or NR system can consider supporting a method in which a vehicle UE sends data to only a specific node through uni-cast and a method in which a vehicle UE sends data to a plurality of specific nodes through group-cast. For example, such uni-cast or group-cast technology may be effectively used in consideration of a service scenario such as Platooning. More specifically, uni-cast communication may be needed for a purpose for controlling a leader node of a group connected through Platooning to control a specific node, and group-cast communication may be needed for a purpose for simultaneously controlling a group configured with a plurality of specific nodes. Particularly, in such Platooning, a relative velocity between nodes is very low, and accordingly, it may be inefficient to determine a default DMRS pattern of a sidelink by reducing intervals between DMRS symbols as possible only in consideration of a high-speed movement environment of V2X, like the LTE system. Accordingly, in an embodiment, the method of following a broadcast/uni-cast/group-cast configuration may use a default DMRS configuration considering a high-speed movement environment among the two default DMRS configurations for a broadcast channel, and another default DMRS configuration considering an environment with a low relative velocity between vehicle nodes in consideration of Platooning for a uni-cast or group-cast channel. Transmission modes considering uni-cast or group-cast together as well as broadcast may be classified as follows.

Configuration Method Through RRC 1-1: whether a transmission mode of a sidelink is broadcast or uni-cast may be explicitly set in (or, by) RRC.

1-2: a sidelink transmission mode may be determined according to whether a search space for SCI set in (or, by) RRC is UE-specific or common. When SCI is mapped to a common search space, a transmission mode may be set to broadcast, and, when SCI is mapped to a UE-specific search mode, a transmission mode may be set to uni-cast or group-cast.

Whether a transmission mode of a sidelink is broadcast or unicast may be determined and identified through CRC masking for PSCCH.

When CRC is scrambled by RNTI for broadcast, a transmission mode may be determined to be set to broadcast.

When CRC is scrambled by RNTI for uni-cast, a transmission mode may be determined to be set to unicast.

When CRC is scrambled by RNTI for group-cast, a transmission mode may be determined to be set to group-cast.

Whether a transmission mode is broadcast, uni-cast, or group-cast may be set through destination L2 ID included in MAC PDU transmitted on an application layer.

The above-described operations may be a method for determining whether the corresponding sidelink transmission is broadcast, uni-cast or group-cast, and the 4-symbol DMRS pattern and 2-symbol DMRS pattern shown in FIG. 9 may be set to two default DMRS patterns. In contrast, details about the two default DMRS patterns may be set in (or, by) RRC or SIB. In this case, a default DMRS configuration through a SIB or RRC configuration may indicate other DMRS configuration information, such as whether a DMRS pattern is type 1 or type 2 and the number of additional DMRSs, as well as symbol position information for default DMRS. In the method of following a broadcast/uni-cast/group-cast configuration, it may be possible to indicate one of the two default DMRS configurations for PSCCH and PSSCH, unlike the method of using SCI. According to an embodiment, the method of following a broadcast/uni-cast/group-cast configuration may use a default DMRS configuration considering a high-speed movement environment among the two default DMRS configurations for a broadcast channel, and another default DMRS configuration considering an environment with a low relative velocity between vehicle nodes in consideration of Platooning for a uni-cast or group-cast channel, although not limited thereto. However, it may be possible to divide default DMRS configurations through different channels.

Hereinafter, a method for configuring DMRS information for PSCCH and PSSCH based on the above-described sidelink transmission modes, according to another embodiment, will be described. Unlike the above-described embodiment, a method of configuring a single default DMRS and following a DMRS configuration set in (or, by) RRC when the default DMRS configuration is not used will be described below. Herein, the default DMRS configuration may be determined through CRC masking for PSCCH. For example, when a default DMRS configuration is used for a broadcast channel and a DMRS configuration set in (or, by) RRC is used for uni-cast or group-cast, the following embodiment may be applied.

Whether to follow the default DMRS configuration or the DMRS configuration set in (or, by) RRC may be determined through CRC masking for PSCCH.

When CRC is scrambled by RNTI for broadcast, it may be determined that the corresponding DMRS configuration follows the default DMRS configuration.

When CRC is not scrambled by RNTI for broadcast, it may be determined that the corresponding DMRS configuration follows the DMRS configuration set in (or, by) RRC.

So far, a case of using a default DMRS configuration for a broadcast channel and following a DMRS configuration set in (or, by) RRC for uni-cast or group-cast has been described as an example. However, classifications according to channels and default DMRS configurations according to channels may change.

Hereinafter, a method for configuring a default DMRS configuration according to an uplink transmission waveform will be described with reference to FIG. 10.

Figure 10:
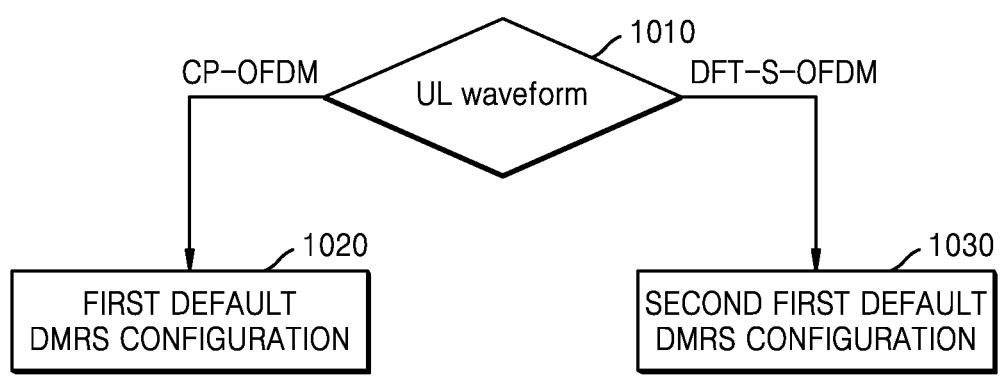
FIG. 10 is a diagram illustrating a method of configuring a default DMRS configuration, according to an embodiment.

FIG. 10 is a diagram showing a method for configuring a default DMRS configuration according to an embodiment.

In the case of a LTE system, a waveform for uplink transmission may be supported only by DFT-S-OFDM, whereas, in the case of a 5G or NR system, a waveform for uplink transmission may be supported by both DFT-S-

OFDM and CP-OFDM. Accordingly, in the case of a sidelink of a 5G or NR system, different default DMRS parameters may be set according to waveforms.

Referring to FIG. 10, in operation 1010, a UE may determine whether an uplink transmission waveform has been set by CP-OFDM or DFT-S-OFDM.

When the uplink transmission waveform has been set by CP-OFDM, the UE may proceed to operation 1010 to apply a first default DMRS configuration. According to an embodiment, in the first default DMRS configuration, a default DMRS parameter of Table A below may be set. In this case, the same default DMRS parameter may be set for PSCCH and PSSCH, except for its sequence length. In contrast, when the uplink transmission waveform has been set by DFT-S-OFDM in operation 1010, the UE may proceed to operation 1030 to apply a second default DMRS configuration. According to an embodiment, in the second default DMRS configuration, a default DMRS parameter of Table B (Alt1 or Alt2) below may be set. In the case of Table B (Alt1), the same default DMRS parameter may be set for PSCCH and PSSCH except for its sequence length, and in the case of Table B (Alt2), different default DMRS parameters may be set for PSCCH and PSSCH with respect to group hopping.

TABLE A

| Parameters for DMRS pattern | Values |
| --- | --- |
| ☐ dmrs-Type ∈ {1, 2} | 2 |
| ☐ DMRS-max-len ∈ {1, 2} | 1 |
| ☐ dmrs-Additional ∈ {0, 1, 2, 3} | 3 (or 1) |
| $N_{ID}^{nSCID}$ | $N_{ID}^{cell}$ |
| $n_{SCID}$ | 0 |
| $M_{sc}^{RS}$ | $M_{sc}^{PSSCH}$ or $M_{sc}^{PSCCH}$ |
| υ | 1 |
| P | 1 |

In Table A, dmrs-Type∈{1,2}, DMRS-max-len∈{1,2}, and dmrs-Additional∈{0,1,2,3} are parameters for determining DMRS patterns, and in a 5G or NR system, values of the parameters may be generally set in (or, by) RRC. However, in a 5G or NR sidelink, the corresponding parameters may be fixed to specific values. Particularly, in the case of considering a broadcast channel of a sidelink, the parameters may need to be fixed to specific values. When the uplink transmission waveform has been set by CP-OFDM, dmrs-Type∈{1,2} may allow two pattern configurations. However, V2X communication needs to secure reception performance of UEs even in a high-speed movement environment, because the V2X communication is communication between vehicles. Accordingly, a large number of dmrs-Additional may be needed. By considering this, dmrs-Type=2 with a low frequency density may be a more suitable selection when DMRS overhead is considered. Although DMRS-max-len∈{1,2} also allows two selections, V2X communication generally supports a low rank. Therefore, when DMRS overhead is considered, DMRS-max-len=1 may be a more suitable selection. In the case of dmrs-Additional∈{0,1,2,3}, dmrs-Additional=3 may be a suitable selection in consideration of a high-speed movement environment of V2X communication. However, additionally configuring dmrs-Additional=1 may be needed in consideration of a service environment such as Platooning. However, the above-described configuration may be only an example, and various configurations may be possible according to situations. For example, in Table A, dmrs-Type=1 may be set.

Then, in Table A, $N_{ID}^{nSCID}$ and $n_{SCID}$, which are parameters required to generate a DMRS sequence, may be used in a formula for generating a DMRS sequence of section 6.4.1.1.1.1 of 3GPP TS 38.211. A value of $N_{ID}^{nSCID}$ may also be set generally in RRC in a 5G or NR system. However, fixing to $N_{ID}^{nSCID}=N_{ID}^{cell}$ and $n_{SCID}=0$ may be a suitable selection in consideration of a broadcast channel of a 5G or NR sidelink. $M_{sc}^{RS}$, which is a DMRS sequence length, may be set to values of different lengths for PSCCH and PSSCH. Explanation: υ and P represent the number of layers and the number of ports, respectively, and may be set to 1 as a default value. However, in a NR system, it may be considered to additionally set Explanation: υ and P to a value that is greater than 1, as a default value. However, the above-described configurations may be only an example, and various configurations may be possible according to situations.

TABLE A

| Parameters for DMRS pattern | Values |
| --- | --- |
| ☐ dmrs-Type ∈ {1} | 1 |
| ☐ DMRS-max-len ∈ {1, 2} | 1 |
| ☐ dmrs-Additional ∈ {0, 1, 2, 3} | 3 (or 1) |
| Group hopping | disabled |
| Sequence hopping | disabled |
| $M_{sc}^{RS}$ | $M_{sc}^{PSSCH}$ or $M_{sc}^{PSCCH}$ |
| υ | 1 |
| P | 1 |

In Table B (Alt-1), dmrs-Type∈{1}, DMRS-max-len∈{1, 2}, and dmrs-Additional∈{0,1,2,3} may be parameters for determining a DMRS pattern, and, in a 5G or NR system, the parameters may be set generally in RRC. However, in a 5G or NR sidelink, the parameters may be fixed to specific values. Particularly, in the case of considering a broadcast channel of a sidelink, the parameters may need to be fixed to specific values. When the uplink transmission waveform has been set by DFT-S-OFDM, dmrs-Type may be set only to 1, unlike CP-OFDM. Although DMRS-max-len∈{1,2} also allows two selections, V2X communication may support a low rank and need to secure reception performance of UEs even in a high-speed movement environment, because V2X communication is communication between vehicles. Accordingly, a large number of dmrs-Additional may be needed. In the same reason, in the case of considering DMRS overhead, DMRS-max-len=1 may be a more suitable selection. In the case of dmrs-Additional∈{0,1,2,3}, dmrs-Additional=3 may be a suitable selection in consideration of a high-speed movement environment of V2X communication. However, it may be needed to additionally configure dmrs-Additional=1 in consideration of a service environment such as Platooning. However, the above-described configurations may be only an example, and various configurations may be possible according to situations.

Then, Table B (Alt-1) shows parameters required to generate a DMRS sequence through group hopping and sequence hopping, and is used in a formula for generating a DMRS sequence of section 6.4.1.1.1.2 of 3GPP TS38.211. In the case of a 5G or NR sidelink, when sequence generation does not support group hopping and sequence hopping, parameters required for group hopping and sequence hopping in generating a DMRS sequence may disappear. $M_{sc}^{RS}$, which is a DMRS sequence length, may be set to values of different lengths for PSCCH and PSSCH. Explanation: υ and P may represent the number of layers and the number of ports, respectively, and may be set to 1 as a default value.

However, in a 5G or NR system, it may be considered to additionally set Explanation: υ and P to a value that is greater than 1, as a default value. However, the above-described configurations may be only an example, and various configurations may be possible according to situations.

TABLE B

[Alt 2]

| Parameters for DMRS pattern | Values for PSSCH | Values for PSCCH |
|---|---|---|
| ☐ dmrs-Type ∈ {1} | 1 | 1 |
| ☐ DMRS-max-len ∈ {1, 2} | 1 | 1 |
| ☐ dmrs-Additional ∈ {0, 1, 2, 3} | 3 (or 1) | 3 (or 1) |
| Group hopping | enabled | disabled |
| $n_{ID}^{RS}$ | $n_{ID}^{X}$ | — |
| $n_{s,f}^{\mu}$ | $n_{ss}^{PSSCH}$ | — |
| Sequence hopping | disabled | disabled |
| $M_{sc}^{RS}$ | $M_{sc}^{PSSCH}$ | $M_{sc}^{PSCCH}$ |
| υ | 1 | 1 |
| P | 1 | 1 |

In Table B (Alt-2), dmrs-Type∈{1}, DMRS-max-len∈{1, 2}, and dmrs-Additional∈{0,1,2,3} are parameters for determining DMRS patterns, and in the 5G or NR system, values of the parameters may be generally set in (or, by) RRC. However, in a 5G or NR sidelink, the parameters may be fixed to specific values. Particularly, in the case of considering a broadcast channel of a sidelink, the parameters may need to be fixed to specific values. When an uplink transmission waveform has been set by DFT-S-OFDM, dmrs-Type may be set only to 1 unlike CP-OFDM. Although dmrs-Type∈{1,2} also allows two selections, V2X communication may support a low rank and need to secure reception performance of UEs even in a high-speed movement environment, because the V2X communication is communication between vehicles. Accordingly, a large number of dmrs-Additional may be needed. For the same reason, when DMRS overhead is considered, DMRS-max-len=1 may be a more suitable selection. In the case of dmrs-Additional∈{0, 1,2,3}, dmrs-Additional=3 may be a suitable selection in consideration of a high-speed movement environment of V2X communication. However, it may be needed to additionally configure dmrs-Additional=1 in consideration of a service environment such as Platooning. However, the above-described configurations may be only an example, and various configurations may be possible according to situations.

Then, Table B (Alt-1) shows parameters required to generate a DMRS sequence through group hopping and sequence hopping, and is used in a formula for generating a DMRS sequence of section 6.4.1.1.1.2 of 3GPP TS38.211. Unlike Table B (Alt-1), Table B (Alt-2) shows a method of supporting group hopping for PSCCH in generating a sidelink sequence, and for the method, parameters required for $n_{ID}^{RS}$ and $n_{s,f}^{\mu}$ may be needed. $n_{ID}^{RS}$ may be determined to be decimal of PSCCH CRS, wherein $$N_{ID}^{X} = \sum_{i=0}^{L-1-i} p_i \cdot 2^{L-1-i}$$

and values of p and L are disclosed in section 5.1 of 3GPP TS38.212. Also, $n_{s,f}^{\mu}$ represents a slot index in a frame according to numerology, and may be mapped to the corresponding slot index $n_{ss}^{PSSCH}$ of a sidelink, which is determined according to a definition of a resource pool of a 5G or NR sidelink. $M_{sc}^{RS}$, which is a DMRS sequence length, may be set to values of different lengths for PSCCH and PSSCH. υ and P represent the number of layers and the number of ports, respectively, and may be set to 1 as a default value. However, in the 5G or NR system, it may be considered to additionally set Explanation: υ and P to a value that is greater than 1, as a default value. However, the above-described configurations may be only an example, and various configurations may be possible according to situations.

According to an embodiment, by applying a suitable DMRS pattern when V2X communication is performed, it may be possible to minimize overhead for DMRS and improve transmission efficiency.

Figure 11:
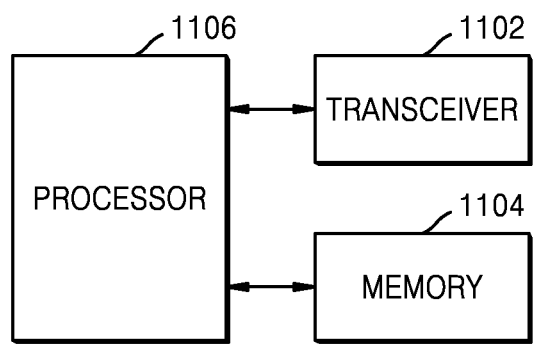
FIG. 11 is a block diagram illustrating an internal structure of a UE according to an embodiment.

FIG. 11 is a block diagram illustrating an internal structure of a UE according to an embodiment.

Referring to FIG. 11, a UE may include a transceiver 1102, a memory 1104, and a processor 1106. According to the above-described communication method of the UE, the transceiver 1102, the memory 1104, and the processor 1106 of the UE may operate. However, components of the UE are not limited to the above-described examples. For example, the UE may be configured with more components than those described above or with less components than those described above. Also, the transceiver 1102, the memory 1104, and the processor 1106 may be implemented in a form of one chip.

The transceiver 1102 may transmit/receive signals to/from a gNB. Herein, the signals may include control information and data. To transmit and receive the signals, the transceiver 1102 may be composed of an RF transmitter for up-converting a frequency of a signal to be transmitted and amplifying the signal, an RF receiver for low-noise amplifying a received signal and down-converting a frequency of the received signal, etc. However, the RF transmitter and RF receiver are an embodiment of the transceiver 1102, and components of the transceiver 1102 are not limited to the RF transmitter and the RF receiver.

Also, the transceiver 1102 may receive a signal through a wireless channel, output the signal to the processor 1106, and transmit a signal output from the processor 1106 through the wireless channel.

The memory 1104 may store programs and data required for operations of the UE. Also, the memory 1104 may store control information or data included in signals obtained by the UE. The memory 1104 may be configured with storage media, such as read only memory (ROM), random access memory (RAM), a hard disc, compact disc-read only memory (CD-ROM), and a digital versatile disc (DVD), or a combination of the storage media. Also, the memory 1104 may be configured with a plurality of memories. According to an embodiment, the memory 1104 may store a program for supporting beam-based cooperative communication.

The processor 1106 may control a series of processes such that the UE operates according to the above-described embodiments. The processor 1106 may perform some of the above-described embodiments although not limited thereto, or the processor 1106 may control all processes such that the UE can operate according to all or a part of the above-described embodiments. According to an embodiment, the processor 1106 may obtain DMRS configuration information, apply the first default DMRS configuration or the second default DMRS configuration based on the DMRS configuration information, and perform the V2X communication through the first default DMRS configuration or the second default DMRS configuration.

Figure 12:
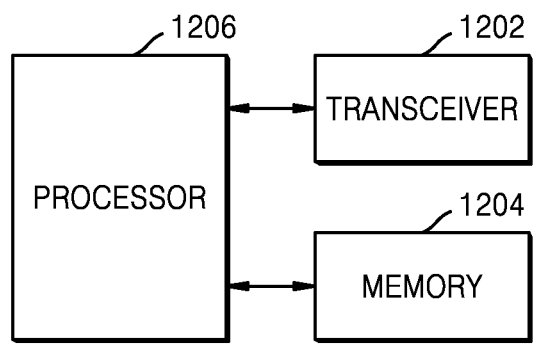
FIG. 12 is a block diagram illustrating an internal structure of a base station according to an embodiment.

FIG. 12 is a block diagram illustrating an internal structure of a gNB according to an embodiment.

Referring to FIG. 12, the gNB may include a transceiver 1201, a memory 1204, and a processor 1206. According to the above-described communication method of the gNB, the transceiver 1202, the memory 1204, and the processor 1206 of the gNB may operate. However, components of the gNB are not limited to the above-described examples. For example, the gNB may be configured with more components than those described above or with less components than those described above. Also, the transceiver 1202, the memory 1204, and the processor 1206 may be implemented in a form of one chip. According to an embodiment, the gNB may include an entity included in the gNB and a core network, and include, for example, AMF, SMF, etc.

The transceiver 1202 may transmit/receive signals to/from a UE. Herein, the signals may include control information and data. To transmit and receive the signals, the transceiver 1202 may be composed of an RF transmitter for up-converting a frequency of a signal to be transmitted and amplifying the signal, an RF receiver for low-noise amplifying a received signal and down-converting a frequency of the received signal, etc. However, the RF transmitter and RF receiver are an embodiment of the transceiver 1202, and components of the transceiver 1202 are not limited to the RF transmitter and the RF receiver.

Also, the transceiver 1202 may receive a signal through a wireless channel, output the signal to the processor 1206, and transmit a signal output from the processor 1206 through the wireless channel.

The memory 1204 may store programs and data required for operations of the gNB. Also, the memory 1204 may store control information or data included in signals obtained by the gNB. The memory 1204 may be configured with storage media, such as ROM, RAM, a hard disc, CD-ROM, and DVD, or a combination of the storage media. Also, the memory 1204 may be configured with a plurality of memories. According to an embodiment, the memory 1204 may store a program for supporting beam-based cooperative communication.

The processor 1206 may control a series of processes such that the UE operates according to the above-described embodiments. The processor 1206 may perform some of the above-described embodiments although not limited thereto, or the processor 1206 may control all processes such that the UE can operate according to all or a part of the above-described embodiments.

The methods according to the embodiments of the disclosure described in claims or specification thereof may be implemented in hardware, software, or a combination of hardware and software.

When the methods are implemented in software, a computer-readable storage medium or a computer program product storing at least one program (software module) may be provided. The at least one program stored in the computer-readable storage medium or the computer program product may be configured for execution by at least one processor within an electronic device. The at least one program may include instructions that cause the electronic device to execute the methods according to the embodiments of the disclosure described in the claims or specification thereof.

The program (software module or software) may be stored in RAM, a non-volatile memory including a flash memory, ROM, an electrically erasable programmable ROM (EEPROM), a magnetic disc storage device, CD-ROM, DVDs or other types of optical storage devices, and a magnetic cassette. Alternatively, the program may be stored in a memory that is configured as a combination of some or all of the memories. A plurality of such memories may be included.

Furthermore, the program may be stored in an attachable storage device that may be accessed through communication networks such as the Internet, Intranet, a local area network (LAN), a wide LAN (WLAN), or a storage area network (SAN) or a communication network configured in a combination thereof. The storage device may access a device performing the embodiments of the disclosure through an external port. Further, a separate storage device on the communication network may also access the device performing the embodiments of the disclosure.

In the embodiments of the disclosure, a component included in the disclosure is expressed in a singular or plural form depending on the described embodiments of the disclosure. However, singular or plural expressions are selected to be suitable for the presented situations for convenience, and the disclosure is not limited to the singular or plural form. A component expressed in a plural form may be configured as a single component, or a component expressed in a singular form may be configured as a plurality of components.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed. For example, a part of an embodiment of the disclosure may be combined with a part of another embodiment of the disclosure. Also, the embodiments of the disclosure may be applied to other systems (for example, a LTE system, a 5G or NR system, etc.), and other modified examples based on the technical concept of the embodiments may also be executed.

The invention claimed is:

1. A method performed by a first user equipment (UE) in a wireless communication system, the method comprising:
   receiving first information associated with at least one demodulation reference signal (DMRS) pattern for sidelink communication from a base station;
   selecting a DMRS pattern for performing sidelink communication with a second UE from among the at least one DMRS pattern, wherein in case that a sidelink transmission mode of the first UE is a broadcast mode, a first DMRS pattern is selected as the DMRS pattern, and wherein in case that the sidelink transmission mode of the first UE is a uni-cast mode or a group-cast mode, a second DMRS pattern is selected as the DMRS pattern; and
   transmitting sidelink control information (SCI) comprising second information indicating the DMRS pattern to the second UE via a physical sidelink control channel (PSCCH).

2. The method of claim 1, wherein the first information associated with the at least one DMRS pattern indicates the first DMRS pattern with four DMRS symbols in a slot and the second DMRS pattern with two DMRS symbols in a slot.

3. The method of claim 1, wherein the first information associated with the at least one DMRS pattern is received by a system information block (SIB) or a radio resource control (RRC) message.

4. The method of claim 1, wherein the second information indicating the DMRS pattern comprises one information bit.

5. The method of claim 1, further comprising:
receiving third information associated with a resource pool for sidelink communication from the base station,
wherein the transmitting of the SCI to the second UE via the PSCCH comprises transmitting the SCI by using a resource from among the resource pool.

6. The method of claim 5, wherein the resource is assigned through downlink control information (DCI) transmitted via a physical downlink control channel (PDCCH) from the base station, or is selected by the first UE from the resource pool.

7. The method of claim 5, wherein the third information associated with the resource pool is received by a system information block (SIB) or a radio resource control (RRC) message.

8. The method of claim 5, further comprising:
obtaining mapping information representing which DMRS pattern of the at least one DMRS pattern each of a plurality of resource pools for sidelink communication corresponds to,
wherein the selecting of the DMRS pattern comprises selecting, as the DMRS pattern for performing sidelink communication with the second UE, a DMRS pattern corresponding to the resource pool received from the base station from among the plurality of resource pools, based on the mapping information, and
wherein the mapping information is received from the base station through a system information block (SIB), or is received through a radio resource control (RRC) connection to the base station or another UE other than the UE.

9. The method of claim 1, wherein the first DMRS pattern and the second DMRS pattern are divided through cyclic redundancy check (CRC) masking for the PSCCH.

10. A first user equipment (UE) in a wireless communication system, the first UE comprising:
a transceiver; and
at least one processor operably connected to the transceiver and configured to:
control the transceiver to receive first information associated with at least one demodulation reference signal (DMRS) pattern for sidelink communication from a base station,
select a DMRS pattern for performing sidelink communication with a second UE from among the at least one DMRS pattern, wherein in case that a sidelink transmission mode of the first UE is a broadcast mode, a first DMRS pattern is selected as the DMRS pattern, and
wherein in case that the sidelink transmission mode of the first UE is a uni-cast mode or a group-cast mode, a second DMRS pattern is selected as the DMRS pattern, and
control the transceiver to transmit sidelink control information (SCI) comprising second information indicating the DMRS pattern to the second UE via a physical sidelink control channel (PSCCH).

11. The first UE of claim 10, wherein the first information associated with the at least one DMRS pattern indicates the first DMRS pattern with four DMRS symbols in a slot and the second DMRS pattern with two DMRS symbols in a slot.

12. The first UE of claim 10, wherein the first information associated with the at least one DMRS pattern is received by a system information block (SIB) or a radio resource control (RRC) message.

13. The first UE of claim 10, wherein the second information indicating the DMRS pattern comprises one information bit.

14. The first UE of claim 10, wherein the at least one processor is further configured to:
control the transceiver to receive third information associated with a resource pool for sidelink communication from the base station, and
control the transceiver to transmit the SCI to the second UE via the PSCCH by using a resource from among the resource pool.

15. The first UE of claim 14, wherein the resource is assigned through downlink control information (DCI) transmitted via a physical downlink control channel (PDCCH) from the base station, or is selected by the first UE from the resource pool.

16. The first UE of claim 14, wherein the third information associated with the resource pool is received by a system information block (SIB) or a radio resource control (RRC) message.

17. The first UE of claim 14, wherein the at least one processor is further configured to:
obtain mapping information representing which DMRS pattern among the at least one DMRS pattern each of a plurality of resource pools for sidelink communication corresponds to, and
select, as the DMRS pattern for performing sidelink communication with the second UE, a DMRS pattern corresponding to the resource pool received from the base station from among the plurality of resource pools based on the mapping information,
wherein the mapping information is received from the base station through a system information block (SIB), or is received through aa radio resource control (RRC) connection to the base station or another UE other than the UE.

18. The first UE of claim 10, wherein the first DMRS pattern and the second DMRS pattern are identified through cyclic redundancy check (CRC) masking for the PSCCH.

* * * * *